(Model.)
J. THOMPSON.
BOX JOINT FOR SEWER PIPES.
No. 250,765. Patented Dec. 13, 1881.
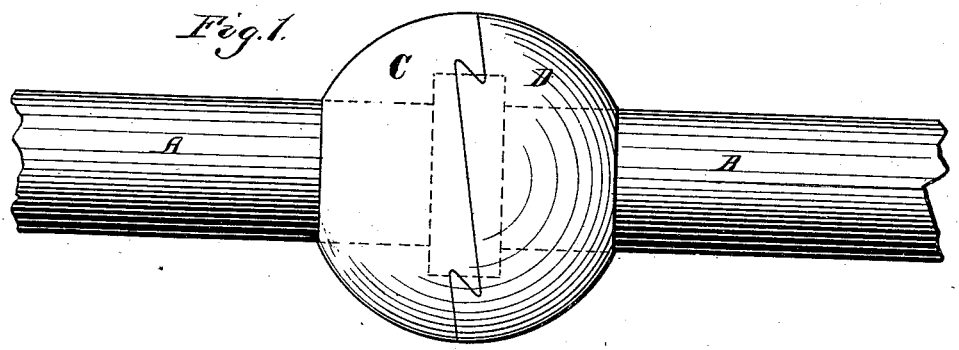
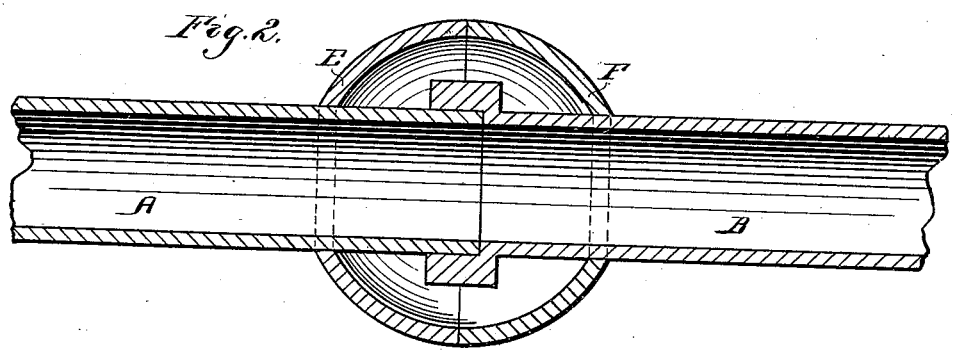
Witnesses
Henry Frankfurter
Inventor.
James Thompson
per. Jas. A. Cowles
Attorney.

UNITED STATES PATENT OFFICE.

JAMES THOMPSON, OF CHICAGO, ILLINOIS, ASSIGNOR OF ONE-HALF TO JOHN H. JETT, OF SAME PLACE.

BOX-JOINT FOR SEWER-PIPES.

SPECIFICATION forming part of Letters Patent No. 250,765, dated December 13, 1881.

Application filed March 26, 1881. (Model.)

*To all whom it may concern:*

Be it known that I, JAMES THOMPSON, of the city of Chicago, in the county of Cook and State of Illinois, have invented certain new and useful Improvements in Box-Joints for Sewer-Pipes, of which the following is the specification, reference being had to the accompanying drawings and figures and letters of reference marked thereon.

In the construction of sewer-pipe great difficulty has been found in properly closing the joints so as to prevent the escape of the gas.

The object of this invention is to so construct a joint in a sewer-pipe as to entirely prevent the escape of sewer-gas. I do this by placing around the pipe, at the joints thereof, a box suitably packed with impervious material, as hereinafter shown.

Figure 1 is a view of the box placed in position on the pipe over the joint, the joining edge of the two sections having ratchet-teeth edges. Fig. 2 is a vertical sectional view of the box over the joint, the joining edge of the two sections being smooth.

My box is made in globular form and divided into halves vertically, each half resting on the sewer-pipe, and the two halves together form a box over the joint.

A and B are sections of ordinary sewer-pipe, having the common construction for joining the ends, as shown in dotted lines in Fig. 1.

C and D are sections of a globular box, having in each section a round hole through which pass the sewer-pipes A and B. These two sections are placed over the joining ends of the pipe, thus forming a box over the joints of the sewer-pipe. The uniting edges of the two sections C and D of the box are made in ratchet form, and thus the two sections are locked together.

Fig. 2 shows a similar construction to Fig. 1, only that the joining edges of the two sections are made plane, and are placed over the joints of the pipe. Within this box is packed as firmly as desired any suitable material impervious to the escaping sewer-gas. By compactly packing the interior of the box, as herein shown, a firm and solid joint is formed which utterly precludes the escape of any gas. This construction also strengthens the joint, and consequently it will not easily get out of repair.

I am aware that a box-joint for sewer-pipe has been made in one entire piece which is slipped over the abutting ends of the pieces of pipe, and a thin cement poured through a hole into said box. This does not include my invention. My box, made in semi-globular sections and then placed in position over the joint and packed with firm plastic cement impermeable to sewer-gas, makes not only a different constructed joint, but one of superior merit.

I am aware that a box-joint has been made in halves by splitting the box longitudinally and uniting the two halves on one side by means of a hinge, and then clasping the two hinged parts around the joint of the pipe and keying them together, thus making the stability and strength of the box depend upon the character and durability of the hinge and key. These being made of metal will soon become worthless because of rust, as they are constantly exposed to moisture when in position. In the improvement herein shown this difficulty is entirely remedied. By splitting or dividing the box vertically I do away with the hinge and key and rest the box directly on the pipe, consequently the box will last as long as the pipe.

What I claim is—

A box-joint of globular form divided into halves vertically, each half having a hole therein, which admits the box being slipped onto the pipe over the joint, the interior of the box being packed with material impervious to gas, the pipe thus supporting the box directly, without the use of hinge or key, substantially as shown, and for the purpose described.

JAMES THOMPSON.

Witnesses:
 J. H. JETT,
 FRANK SAYRE OSBORNE.